Jan. 20, 1931.    T. H. THOMAS    1,789,934
FLUID PRESSURE BRAKE
Filed Aug. 7, 1929
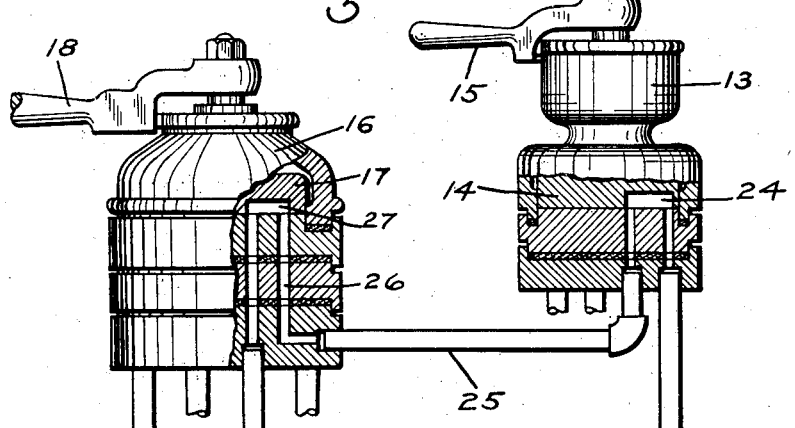
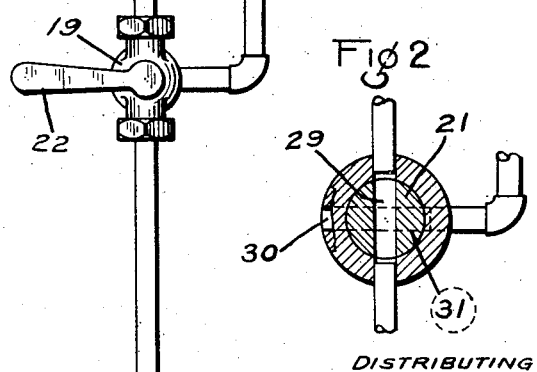
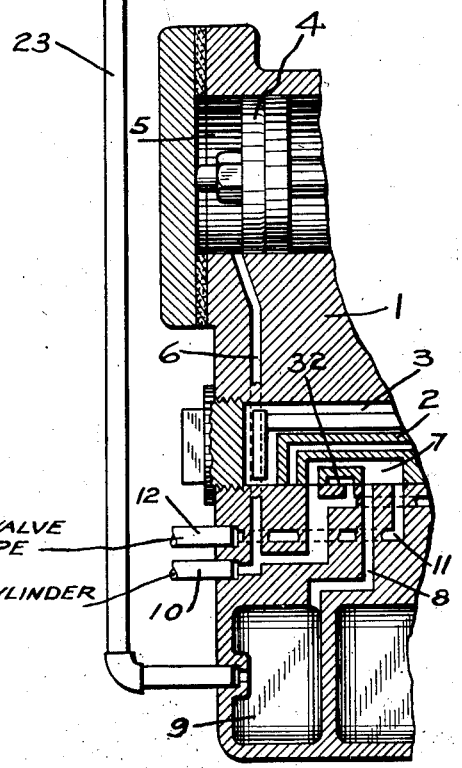
INVENTOR
THOMAS H. THOMAS (DEC'D)
MABLE M. THOMAS, EXECUTRIX
BY Wm. M. Cady
ATTORNEY Patented Jan. 20, 1931

1,789,934

UNITED STATES PATENT OFFICE

THOMAS H. THOMAS, DECEASED, LATE OF EDGEWOOD, PENNSYLVANIA, BY MABLE M. THOMAS, EXECUTRIX, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

FLUID-PRESSURE BRAKE

Application filed August 7, 1929. Serial No. 384,075.

This invention relates to fluid pressure brakes, and more particularly to a locomotive brake equipment.

The well known E. T. locomotive brake equipment comprises a distributing valve device having an equalizing portion and an application portion and when the equalizing portion is operated upon a reduction in brake pipe pressure, fluid under pressure is supplied to an application chamber and to the application cylinder of the application portion, so that the application portion is operated to supply fluid under pressure to the locomotive brake cylinders.

An automatic brake valve device and an independent brake valve device are provided and in running position, the application chamber is connected to the atmosphere by way of the distributing valve release pipe, through ports controlled by the equalizing portion and through ports in the independent brake valve and the automatic brake valve.

It is sometimes the case that the slide valve of the equalizing portion will move from release position toward application position when it is not intended to effect an application of the brakes, such as where the brake pipe is overcharged in the release position of the automatic brake valve and then when the brake valve is moved to running position, the pressure chamber of the equalizing portion of the distributing valve device having been overcharged from the brake pipe, the equalizing piston may shift the equalizing slide valve from release position toward application position far enough to blank the distributing valve release pipe connection to the application chamber, and then leakage past the slide valve of the equalizing portion to the application chamber may be sufficient to cause the application portion to operate to apply the brakes. The movement of the automatic brake valve from release position to running position connects the distributing valve release pipe to the atmosphere, but fluid is not released under the above conditions from the application chamber, since the movement of the equalizing slide valve from release position toward application position has cut off communication from the application chamber to the distributing valve release pipe.

The principal object of the invention is to provide means for preventing an undesired application of the brakes under the above circumstances.

For accomplishing this purpose of the invention, there is provided a pipe connection direct from the application chamber of the distributing valve device, which is open to the atmosphere only when the independent brake valve and the automatic brake valve are in running position, this direct pipe connection being connected to the atmosphere through the usual double heading cock, except when the cock is in its double heading position.

In view of the fact that the E. T. locomotive brake equipment is well known and extensively used in railway brake service, it is not deemed necessary to a clear understanding of the invention to show and describe such an equipment in its entirety, and consequently only so much of the equipment is shown and described as seems necessary to fully explain the construction and operation of the improvement.

In the accompanying drawing, Figure 1 is a diagrammatic view, partly in section, of a portion of an E. T. locomotive brake equipment, showing the invention embodied therein; and Fig. 2 a transverse section of the double heading cock.

In the drawing, the reference numeral 1 indicates a portion of a distributing valve device comprising an equalizing portion and an application portion. The equalizing portion comprises a slide valve 2 contained in valve chamber 3 and adapted to be operated by an equalizing piston (not shown). The application portion comprises a piston 4 contained in application cylinder 5 and said piston is operated by fluid under pressure supplied to the cylinder 5 for operating a valve (not shown) for supplying fluid under pressure to the brake cylinder (not shown).

In the release position of slide valve 2, as shown in the drawing, the application cylinder 5 is connected through a passage 6 and a cavity 7 in the slide valve with passage 8 leading to the application chamber 9 and also with passage 11, leading to the distributing valve release pipe 12. Passage 6 also connects directly with the application cylinder pipe 10.

The independent brake valve device 13 comprises a casing containing a rotary valve 14 adapted to be operated by a handle 15 and the automatic brake valve device 16 includes a rotary valve 17 adapted to be operated by a handle 18.

A double heading cock 19 is disposed in the usual brake pipe 20 and has a plug valve 21 adapted to be operated by a handle 22.

According to the invention, a pipe 23 is connected directly to the application chamber 9 and said pipe is connected in the running position only of the independent brake valve 13, through a cavity 24 in the rotary valve 14 with a pipe 25 which communicates with a passage 26 in the automatic brake valve device 16, leading to the seat of the rotary valve 17.

In the running position only of the automatic brake valve, the passage 26 is connected through a cavity 27 in the rotary valve 17 with a pipe 28. In the normal position of the plug valve 21 of the double heading cock, communication through the brake pipe 20 is established by way of port 29 and in this position, as shown in Fig. 2, pipe 28 is connected to an atmospheric port 30 through port 31. In the double heading position of the cock, communication through the brake pipe is cut off and the pipe 28 is also cut off from the atmosphere.

With the two brake valves in running position, as shown in the drawing, and with the double heading cock in normal position, the application chamber 9 is connected to the atmosphere as above described and if the equalizing slide valve 2 should move from release position toward application position, while communication from the application cylinder to the distributing valve release pipe 12 would be cut off, communication will be established from passage 6, through cavity 32 in the slide valve 2, with passage 8, so that the application chamber 9 is connected to the application cylinder 5. If fluid under pressure should now leak past the slide valve 2 into the application chamber 9, such fluid will be vented through pipe 23, cavity 24 in the rotary valve 14, cavity 27 in the rotary valve 17, pipe 28, and through port 31 in the double heading cock 19, to the atmosphere, by way of the port 30.

Fluid pressure cannot therefore be built up in the application chamber 9 and in the application cylinder 5, by leakage past the slide valve 2, and consequently the brakes will not be applied under the above conditions.

In double heading, the cock 21 is turned on the second engine to the position in which communication through the brake pipe to the brake valve on the second engine is cut off. In this position, communication is also cut off from the pipe 28 to the atmosphere.

While one illustrative embodiment of the invention has been described in detail, it is not the intention to limit its scope to that embodiment or otherwise than by the terms of the appended claims.

Having now described the invention, what is claimed as new and desired to secure by Letters Patent, is:

1. In a fluid pressure brake, the combination with a brake application valve device having an application cylinder and operated by fluid pressure in said cylinder for effecting an application of the brakes, of an equalizing valve device having a slide valve adapted to connect said application cylinder to an application chamber in effecting an application of the brakes, and a pipe directly connected to said application chamber through which fluid is vented from said chamber to the atmosphere.

2. In a fluid pressure brake, the combination with a brake application valve device having an application cylinder and operated by fluid pressure in said cylinder for effecting an application of the brakes, of an equalizing valve device having a slide valve adapted to connect said application cylinder to an application chamber in effecting an application of the brakes, a pipe directly connected to said chamber, and a brake valve device having a position in which said pipe is connected to the atmosphere.

3. In a fluid pressure brake, the combination with a brake application valve device having an application cylinder and operated by fluid pressure in said cylinder for effecting an application of the brakes, of an equalizing valve device having a slide valve adapted to connect said application cylinder to an application chamber in effecting an application of the brakes, a pipe directly connected to said chamber, and a brake valve device adapted in running position to connect said pipe to the atmosphere.

4. In a fluid pressure brake, the combination with a brake application valve device having an application cylinder and operated by fluid pressure in said cylinder for effecting an application of the brakes, of an equalizing valve device having a slide valve adapted to connect said application cylinder to an application chamber in effecting an application of the brakes, a pipe directly connected to said chamber, an automatic brake valve device, and an independent brake valve device having positions in which said pipe is connected to the atmosphere.

5. In a fluid pressure brake, the combination with a brake application valve device having an application cylinder and operated by fluid pressure in said cylinder for effecting an application of the brakes, of an equalizing valve device having a slide valve adapted to connect said application cylinder to an application chamber in effecting an application of the brakes, a pipe directly connected to said chamber, an automatic brake valve device, and an independent brake valve device, communication through said pipe to the atmosphere being established when said valve devices are in running position.

6. In a fluid pressure brake, the combination with a brake application valve device having an application cylinder and operated by fluid pressure in said cylinder for effecting an application of the brakes, of an equalizing valve device having a slide valve adapted to connect said application cylinder to an application chamber in effecting an application of the brakes, a pipe directly connected to said chamber, a brake valve device having a running position, and a manually operated cock having a position for connecting said pipe to the atmosphere, communication through said pipe to said cock being controlled by said brake valve device.

7. In a fluid pressure brake, the combination with a brake application valve device having an application cylinder and operated by fluid pressure in said cylinder for effecting an application of the brakes, of an equalizing valve device having a slide valve adapted to connect said application cylinder to an application chamber in effecting an application of the brakes, a pipe directly connected to said chamber, a brake valve device having a running position, and a manually operated cock having a position for connecting said pipe to the atmosphere, communication through said pipe to said cock being opened when said brake valve device is in running position.

8. In a fluid pressure brake, the combination with a brake application valve device having an application cylinder and operated by fluid pressure in said cylinder for effecting an application of the brakes, of an equalizing valve device having a slide valve adapted to connect said application cylinder to an application chamber in effecting an application of the brakes, a pipe directly connected to said chamber, a brake valve device having a running position in which said pipe is connected to the atmosphere, and a double heading cock for controlling communication from said pipe through said brake valve device to the atmosphere.

In testimony whereof I have hereunto set my hand.

MABLE M. THOMAS,
*Executrix of the Last Will and Testament of Thomas H. Thomas, Deceased.*